US012656119B2

(12) United States Patent
Magnani et al.

(10) Patent No.: US 12,656,119 B2
(45) Date of Patent: Jun. 16, 2026

(54) INERTIAL AXIS FUSION DEVICE, SYSTEM AND METHOD

(71) Applicant: STMICROELECTRONICS S.r.l., Agrate Brianza (IT)

(72) Inventors: Alessandro Magnani, Milan (IT); Matteo Quartiroli, Certosa di Pavia (IT); Alessandra Maria Rizzo Piazza Roncoroni, Abbiategrasso (IT); Paolo Rosingana, Savigliano (IT)

(73) Assignee: STMICROELECTRONICS S.r.l., Agrate Brianza (IT)

( * ) Notice: Subject to any disclaimer, the term of this patent is extended or adjusted under 35 U.S.C. 154(b) by 622 days.

(21) Appl. No.: 18/160,723

(22) Filed: Jan. 27, 2023

(65) Prior Publication Data

US 2024/0271935 A1 Aug. 15, 2024

(51) Int. Cl.
*G01C 19/5776* (2012.01)
*G06F 7/544* (2006.01)
*H04R 1/10* (2026.01)

(52) U.S. Cl.
CPC .......... *G01C 19/5776* (2013.01); *G06F 7/544* (2013.01); *H04R 1/10* (2013.01); *H04R 2460/13* (2013.01)

(58) Field of Classification Search
CPC .... G01C 19/5776; G01C 21/12; G01C 21/16; G06F 7/544; H04R 1/10; H04R 2460/13
See application file for complete search history.

(56) References Cited

U.S. PATENT DOCUMENTS

| | | | |
|---|---|---|---|
| 8,275,193 B2 | 9/2012 | Lin | |
| 10,162,551 B2 | 12/2018 | Leo et al. | |
| 10,724,863 B2 | 7/2020 | Vasilyuk et al. | |
| 11,340,247 B2 | 5/2022 | Keal et al. | |
| 2007/0233477 A1 | 10/2007 | Halowani et al. | |
| 2012/0136573 A1 | 5/2012 | Janardhanan et al. | |
| 2012/0265716 A1 | 10/2012 | Hunzinger et al. | |
| 2016/0077166 A1 | 3/2016 | Morozov et al. | |
| 2016/0091316 A1* | 3/2016 | Czompo | G01C 21/188 702/152 |
| 2016/0138923 A1* | 5/2016 | Janardhanan | G01C 21/188 701/535 |

(Continued)

FOREIGN PATENT DOCUMENTS

| | | | | |
|---|---|---|---|---|
| CN | 114383608 A * | 4/2022 | ......... | G01C 21/1656 |
| WO | WO 2013093173 A1 | 6/2013 | | |
| WO | WO 2017114578 A1 | 7/2017 | | |

OTHER PUBLICATIONS

"Freqz", MathWorks, obtained Sep. 29, 2020, <https://www.mathworks.com/help/signal/ref/freqz.html>, 9 pages.

*Primary Examiner* — Thomas M Hammond, III
(74) *Attorney, Agent, or Firm* — Seed IP Law Group LLP

(57) ABSTRACT
A device includes one or more inertial sensors and fusion circuitry coupled to the one or more inertial sensors. The inertial sensors, in operation, generate inertial sensor data with respect to a plurality of axes of movement. The fusion circuitry, in a polar fusion mode of operation, applies a plurality of polar rotation operations to the generated inertial sensor data to rotate the generated inertial sensor data onto an axis of the plurality of axes of movement. A fused data signal is generated based on a result of the plurality of polar rotation operations. The plurality of inertial sensors may include bone-conduction sensors.

14 Claims, 8 Drawing Sheets

(56)                 References Cited

U.S. PATENT DOCUMENTS

| 2017/0343577 | A1 | 11/2017 | Lefebvre |
| 2021/0082212 | A1 | 3/2021 | Castellano et al. |
| 2022/0070567 | A1* | 3/2022 | Skoglund ................ G06F 3/013 |

* cited by examiner

INERTIAL AXIS FUSION DEVICE, SYSTEM AND METHOD

BACKGROUND

Technical Field

The present disclosure is directed to multi-axial inertial sensor devices, such as motion sensors used in portable electronic devices, and to systems, such as portable electronic devices and systems employing multi-axial inertial sensor devices.

Description of the Related Art

Multi-axial inertial sensor devices, such as 3-axis gyroscopes, 3-axis accelerometers, sensor arrays including multiple single-axis inertial sensors, etc., generate data signals related to positions, motions, orientations, etc., or combinations thereof, related to a device or an object. For example, motion or vibration data related to a device or an object may be sensed using multi-axial inertial sensors. Such sensors may typically be implemented using micro-electromechanical systems (MEMS).

Portable electronic devices, such as smart phones, headsets, tablets, smart watches, laptops, etc., may employ such multi-axial inertial sensors in various applications, such as event tracking applications (e.g., fitness programs executing, for example, on smart phones or smart watches), speech detection or recognition applications (e.g., audio programs executing, for example, on smart phones and headsets), navigational applications, etc., and various combinations thereof.

In many instances, the data of the respective axes of a multi-axial sensor needs to be fused in order to provide useful data to the applications.

BRIEF SUMMARY

In an embodiment, a device comprises one or more inertial sensors and fusion circuitry coupled to the one or more inertial sensors. The one or more inertial sensors, in operation, generate inertial sensor data with respect to a plurality of axes of movement. The fusion circuitry, in a polar fusion mode of operation, applies a plurality of polar rotation operations to the generated inertial sensor data to rotate the generated inertial sensor data onto an axis of the plurality of axes of movement. A fused data signal is generated based on a result of the plurality of polar rotation operations.

In an embodiment, a system comprises a host processor and a sensing device, which, in operation, is communicatively coupled to the host processor. The sensing device includes one or more inertial sensors and fusion circuitry coupled to the one or more inertial sensors. The inertial sensors, in operation, generate inertial sensor data with respect to a plurality of axes of movement. The fusion circuitry, in a polar fusion mode of operation, applies a plurality of polar rotation operations to the generated inertial sensor data to rotate the generated inertial sensor data onto an axis of the plurality of axes of movement. A fused data signal is generated based on a result of the plurality of polar rotation operations.

In an embodiment, a method comprises generating, using one or more inertial sensors of a sensing device, inertial sensor data with respect to a plurality of axes of movement. A plurality of polar rotation operations are applied to the generated inertial sensor data by fusion circuitry of the sensing device to rotate the generated inertial sensor data onto an axis of the plurality of axes of movement. A fused data signal is generated using the fusion circuitry based on a result of the plurality of polar rotation operations.

In an embodiment, a non-transitory computer-readable medium's contents configure a sensing device to perform a method. The method comprises generating inertial sensor data with respect to a plurality of axes of movement; applying a plurality of polar rotation operations to the generated inertial sensor data to rotate the generated inertial sensor data onto an axis of the plurality of axes of movement; and generating a fused data signal based on a result of the plurality of polar rotation operations.

BRIEF DESCRIPTION OF THE SEVERAL VIEWS OF THE DRAWINGS

One or more embodiments are described hereinafter with reference to the accompanying drawings.

DETAILED DESCRIPTION

The following description, along with the accompanying drawings, sets forth certain specific details in order to provide a thorough understanding of various disclosed embodiments. However, one skilled in the relevant art will recognize that the disclosed embodiments may be practiced in various combinations, with or without one or more of these specific details, or with other methods, components, devices, materials, etc. In other instances, well-known structures or components that are associated with the environment of the present disclosure, including but not limited to inertial sensor structures, MEMS structures, interfaces, power supplies, physical component layout, convolutional neural networks, etc., in a portable electronic device environment, have not been shown or described in order to avoid unnecessarily obscuring descriptions of the embodiments. Additionally, the various embodiments may be methods, systems, devices, computer program products, etc.

Throughout the specification, claims, and drawings, the following terms take the meaning associated herein, unless the context indicates otherwise. The term "herein" refers to the specification, claims, and drawings associated with the current application. The phrases "in one embodiment," "in another embodiment," "in various embodiments," "in some embodiments," "in other embodiments," and other variations thereof refer to one or more features, structures, functions, limitations, or characteristics of the present disclosure, and are not limited to the same or different embodiments unless the context indicates otherwise. As used herein, the term "or" is an inclusive "or" operator, and is equivalent to the phrases "A or B, or both" or "A or B or C, or any combination thereof." and lists with additional elements are similarly treated. The term "based on" is not exclusive and allows for being based on additional features, functions, aspects, or limitations not described, unless the context indicates otherwise. In addition, throughout the specification, the meaning of "a," "an," and "the" include singular and plural references.

Figure 1:
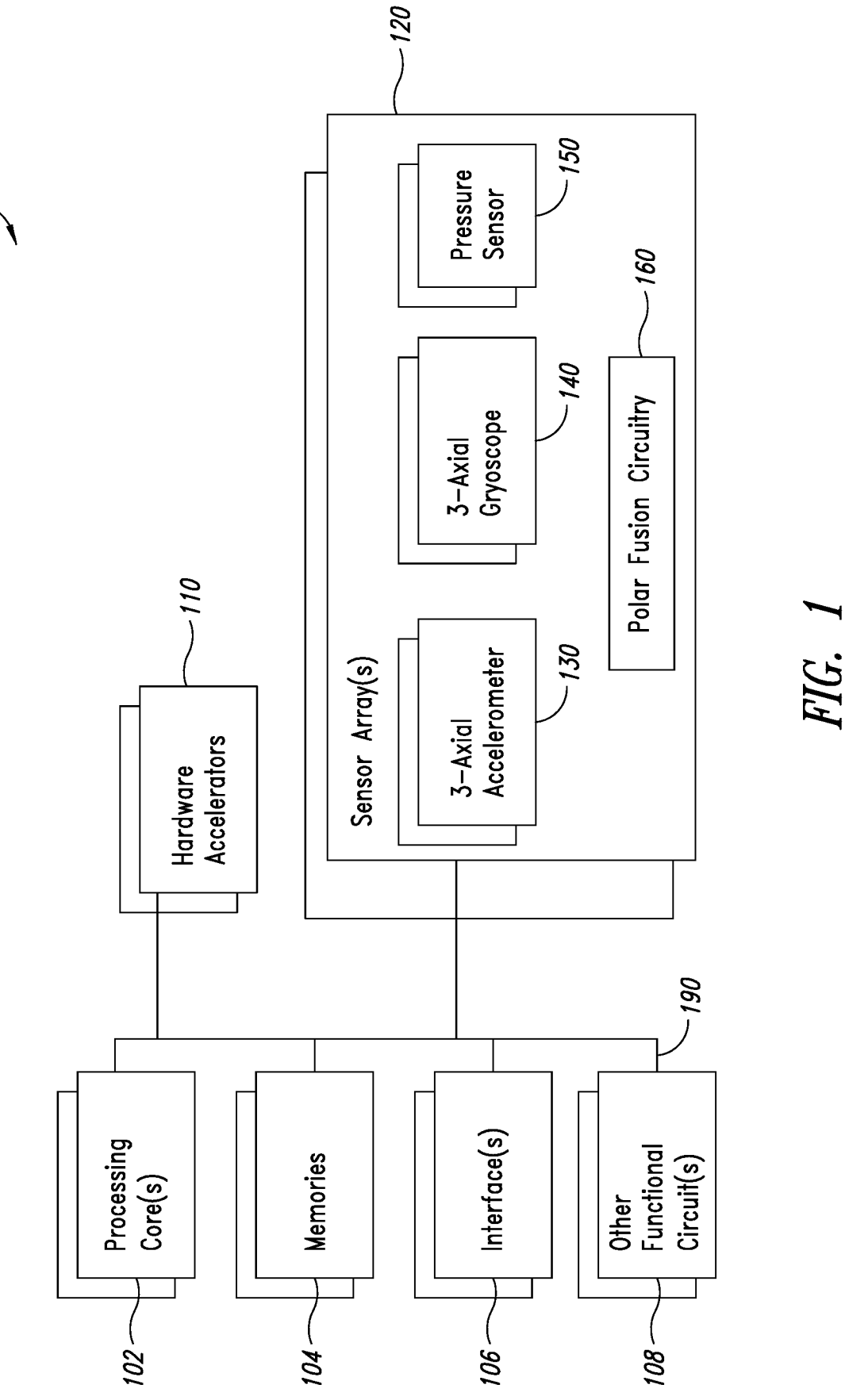
FIG. 1 is a functional block diagram of an embodiment of an electronic device or system employing one or more multi-axial inertial sensor devices.

FIG. 1 is a functional block diagram of an embodiment of an electronic device or system 100 of the type to which described embodiments may apply. The system 100 comprises one or more processing cores or circuits 102. The processing cores 102 may comprise, for example, one or more processors, a state machine, a microprocessor, a programmable logic circuit, discrete circuitry, logic gates, registers, etc., and various combinations thereof. The processing cores may control overall operation of the system 100, execution of application programs by the system 100 (e.g., audio processing programs; programs which classify data, such as images, audio data, etc., using CNNs), etc.

The system 100 includes one or more memories 104, such as one or more volatile and/or non-volatile memories which may store, for example, all or part of instructions and data related to control of the system 100, applications and operations performed by the system 100, etc. One or more of the memories 104 may include a memory array, general purpose registers, etc., which, in operation, may be shared by one or more processes executed by the system 100.

The system 100 includes one or more interfaces 106 (e.g., wireless communication interfaces, wired communication interfaces, etc.), and other functional circuits 108, which may include antennas, power supplies, one or more built-in self-test (BIST) circuits, etc., and a main bus system 190. The main bus system 190 may include one or more data, address, power, interrupt, and/or control buses coupled to the various components of the system 100. The system 100 as illustrated also includes one or more hardware accelerators 110, which may be employed, for example, to accelerate the performance of one or more operations, such as operations associated with implementing a CNN to classify, for example, events associated with sensed sensor signals, such as signals associated with inertial sensor data, etc.

The system 100 also includes one or sensor arrays 120 which may include various sensors (e.g., image sensors, inertial sensors, such as accelerometers, and gyroscopes (which may be multi-axial sensors), pressure sensors, temperature sensors, etc., and various combinations thereof). The sensors, in operation, may generate sensor data for use in various applications executing, for example, under control of one or more of the processing cores 102. As illustrated, the sensor array 120 comprises one or more 3-axial accelerometers 130, one or more 3-axial gyroscopes 140, and one or more pressure sensors 150, such as a MEMS microphone.

Figure 2:
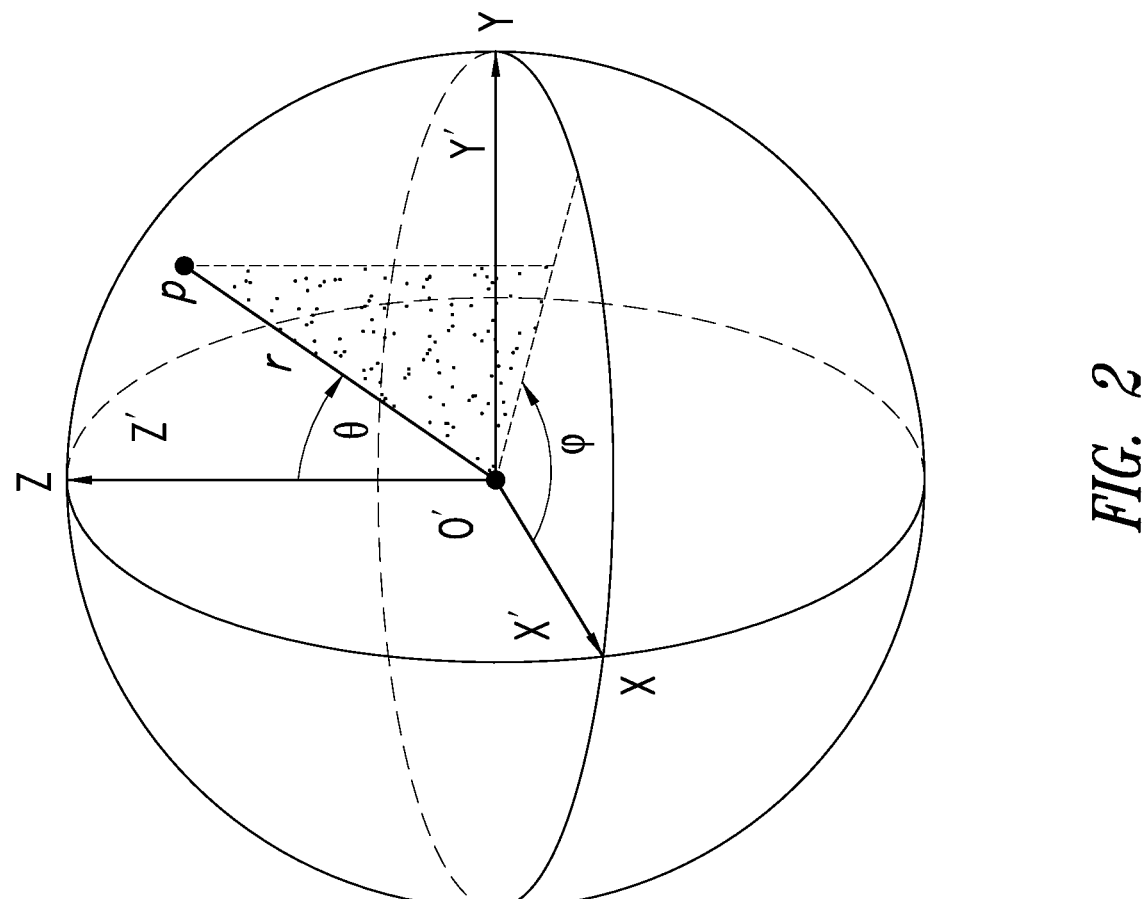
FIG. 2 is a conceptual diagram illustrating the concept of fusing data generated by respective axis of a multi-axial inertial sensor device.

As mentioned above, data signals associated with different axes of a multi-axial sensor device, such as a 3-axial accelerometer 130 or a 3-axial gyroscope 140, may need to be fused to provide a useful data signal to an application. FIG. 2 is a conceptual diagram illustrating the concept of fusion of accelerometer data generated by a 3-axial accelerometer with reference to a Cartesian coordinate system having perpendicular X, Y and Z axes and an origin O'. The 3-axial accelerometer generates data with respect to an X axis of the accelerometer which is represented by the vector X', generates data with respect to a Y axis of the accelerometer which is represented by the vector Y', and generates data with respect to a Z axis of the accelerometer which is represented by the vector Z'. The movement to be sensed is occurring along an axis of movement r, such as a vibration around a point p. The axis of movement r has an angle θ with respect to the Z axis and an angle φ with respect to the X axis.

Figure 3:
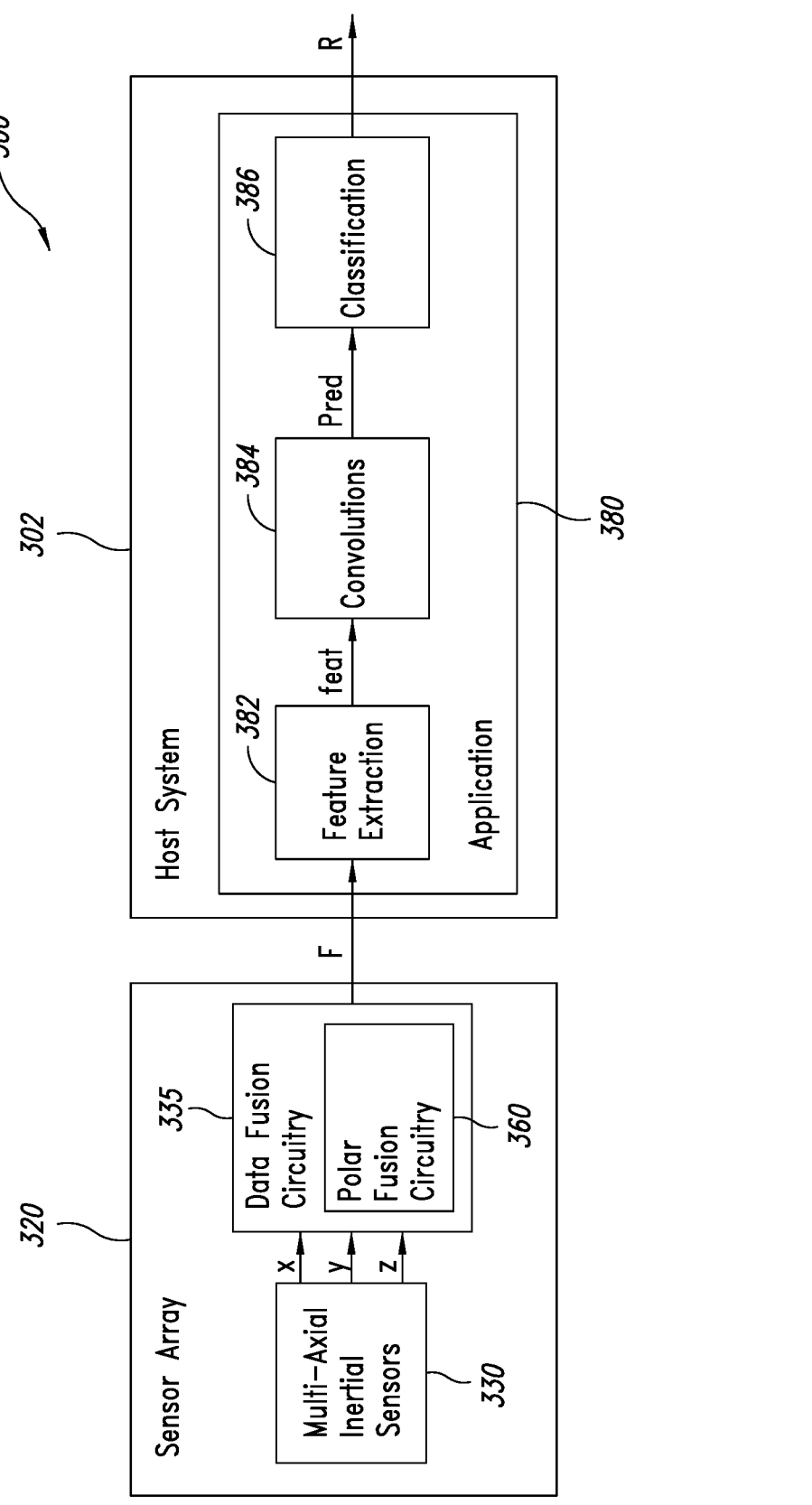
FIG. 3 is a functional block diagram of a system illustrating an example process flow of an application using fused sensor data.
Figure 7:
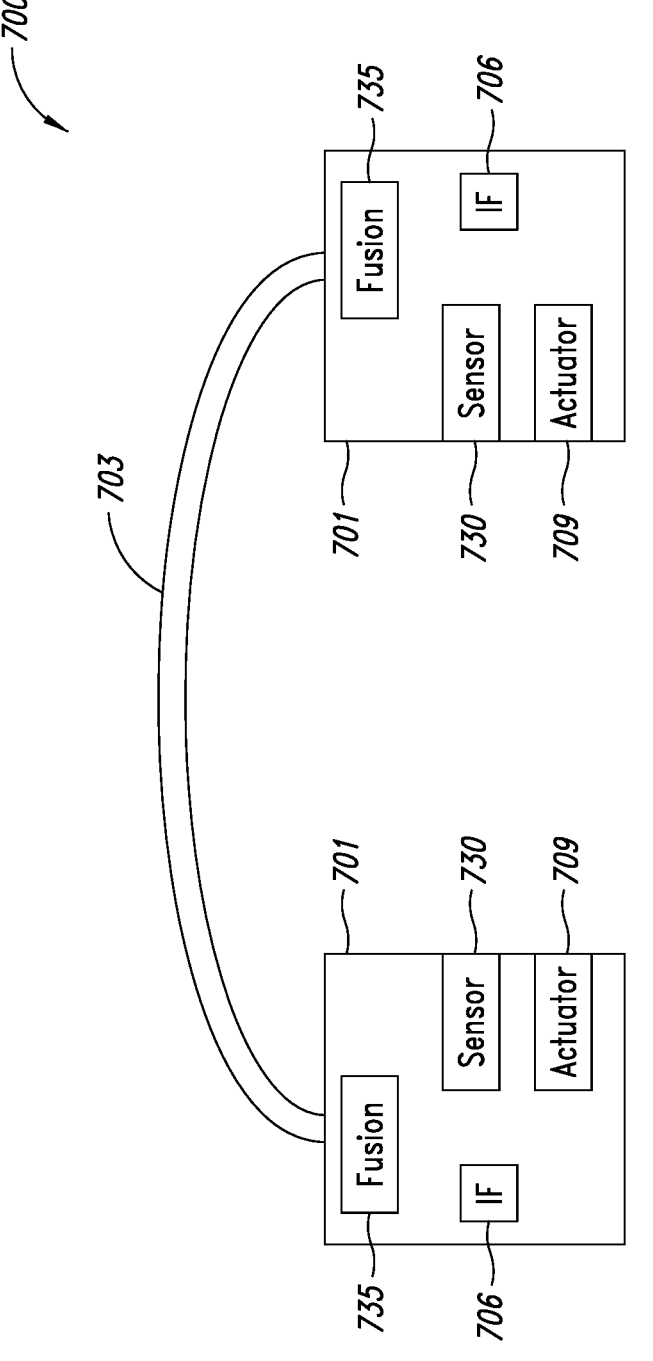
FIG. 7 is a functional block diagram of an embodiment of bone-conduction device having one or more multi-axial sensors.

FIG. 3 is a functional block diagram of a system 300 illustrating an example process flow of an application using fused sensor data, such as an application to process audio signals sensed using bone conduction sensors (see FIG. 7). The system 300 includes a sensor array 320 having one or more multi-axial inertial sensors 330, which may include multi-axial accelerometers, multi-axial gyroscopes, etc., configured to sense data, such as data sensed in response to bone vibrations, which may be used to generate audio signals. A multi-axial sensor 330, in operation, generates data signals, signals ax, ay, az as illustrated, for respective axes of the sensor 330. The data signals ax, ay, az are provided to data fusion circuitry 335. The data fusion circuitry 335, in operation, fuses the data signals ax, ay, az into a fused data signal F. In some embodiments, the sensor array 320 may include other circuitry, not shown in FIG. 3, such as power control circuitry, communication circuitry (e.g., wired or wireless interfaces to couple the sensor array 320 with the host system 302), etc.

As illustrated, the sensor array 320 generates the multi-axial sensor data and fuses the generated data into a fused data signal F. The host system 302 processes the fused data signal F. In the illustrated example, the fused data signal F is received by an application 380 executing on a host system 302. The host system 302 may contain processing circuitry to execute the application 380 (see, e.g., host processor 102, memory 104, hardware accelerator 120 of the system 100 of FIG. 1). The application 380 performs feature extraction on the fused data signal F, generating feature data feat. The feature data feat is processed, as illustrated by performing convolutions 384, to generate predication data Pred. The prediction data Pred is classified 386 to generate a result R. The result R may be, for example: an indication that speech has been detected, which may result in initiation of audio processing of the fused signal F by the host system, initializing of additional sensors, etc.; a recognized word of a speech recognition application; etc.

Conventionally, the data from a multi-axial sensor is fused using a modulus calculation. For example, with respect to a 3-axial sensor device, the magnitude of the vector r may be determined according to $\sqrt{(|ax|^2+|ay|^2+|az|^2)}$, where sqrt is the square root function, ax is the sensor data signal with respect to the x-axis of the sensor, ay is the sensor data signal with respect to the y-axis of the sensor, and az is the sensor data signal with respect to the z axis of the sensor. While FIG. 3 is discussed in the context of a 3-axial accelerometer, the same concept may be applied to fuse other inertial sensor data, such as data from a 2-axial accelerometer, data from a 3-axial gyroscope, data from a 2-axial gyroscope, data from a 6-axial sensor having 3 accelerometer axes and 3 gyroscope axes, data from a plurality of single-axial sensors, data from a multi-axial pressure sensor, etc.

The use of the modulus operation to fuse multi-axial sensor data may result in the loss of information in the fused signal during the fusion process. While a modulus fusion process generally works well for linear data without high-frequency vibrations, a modulus fusion process may lose vibration information and circular movement information present in unfused data signals, for example, when high frequency vibrations are present along an axis which is not aligned with an axis of the multi-axial sensor. For example, bone conduction sensors, such as those used in headphones, often need to detect high-frequency vibrations to detect speech. Generally, the bandwidth of MEMS inertial sensors continues to significantly increase, and conventional modulus-based fusion techniques often do not provide satisfactory results for higher bandwidth sensor applications. In addition, the fused signal of a modulus fusion process is large, resulting in a loss of resolution. With reference to FIG. 3, this loss of information may result in significant errors in the feature extraction 382, convolution 384, and classification 386 processes, resulting in results R that are inaccurate.

In addition, the use of the modulus process is computationally, power and area expensive. To fuse the data from a 3-axial accelerometer using a modulus process, three multiplications, three additions and a square root function are needed. The use of a square root function means a processor is typically needed to performed fusion using a modulus process, as opposed to discrete circuitry such as adders and multipliers. This means that in order to fuse the data at the sensor array 320 using a modulus process, the data fusion circuitry 335 needs to include a processor, with associated processor area, memory, and power requirements.

Instead of using a modulus process, a speed modulus process may be employed which operates in a derivative domain. For example, with respect to a 3-axial sensor device, the magnitude of the vector r may be determined according to $sqrt(diff\|ax\|^2 + diff\|ay\|^2 + diff\|az\|^2)$, where sqrt is the square root function, diff is the derivative function, ax is the sensor data signal with respect to the x-axis of the sensor, ay is the sensor data signal with respect to the y-axis of the sensor, and az is the sensor data signal with respect to the z axis of the sensor. While the use of a speed modulus process may mitigate the loss of information in a fused signal to some extent, the speed modulus process also is computationally expensive. As with the modulus process, a lot of processing power is needed to fuse the data from a 3-axial accelerometer using a speed modulus process; indeed, eight additions, three multiplications and a square root function are needed. Thus, the use of a speed modulus fusion process to fuse the data would not reduce computation resource needs as compared to the use of the modulus process to fuse the data. The data fusion circuitry 335 would still need a processor to fuse the data.

Another fusion process that may be employed would be to sum the signals of the individual axes of the multi-axial sensor 330, optionally performing high-pass filtering before summing. In some circumstances, a sum process results in less information loss than a modulus fusion process. However, the sum process is not suitable for use in some circumstances, such as when there is interference between the signals of the individual axes of the multi-axial sensor 330, and significant loss of information in the fused signal may still occur.

To facilitate reducing information loss in the fusion process, the system 100 of FIG. 1 includes polar fusion circuitry 160, and similarly, the system 300 of FIG. 3 includes polar fusion circuitry 360, which in operation uses polar rotation to rotate the sensor data onto a determined one of the axes of a multi-axial sensor. With reference to FIG. 2, rotating the sensor data onto one of the axes facilitates reducing loss of information in the fusion process due to vibrations along an axis which is not aligned with an axis of the sensor. In addition, as discussed in more detail below, the use of polar rotation may be performed using multiplication and addition operations, without using a square root operation. Thus, polar rotation may be performed using discrete circuitry of the data fusion circuitry 335, such as one or more adders and one or more multipliers (see adders 564 and multipliers 562 in FIG. 5) in the polar fusion circuitry 360, and discrete circuitry may be used instead of a processor in the data fusion circuitry 335 to fuse the sensor data using polar rotation techniques.

Embodiments of the systems 100, 300 of FIGS. 1 and 3 may include more components than illustrated, may include fewer components than illustrated, may combine components, may separate components into sub-components, and various combination thereof. For example, the sensor array 120 may comprise an internal processing circuitry to perform edge AI processing on the fused sensor data. In another example, the sensor array 120 of FIG. 1 may comprise a 6-axial combination accelerometer and gyroscope, a plurality of single axial sensors, etc., instead of or in addition to the illustrated sensors.

Figure 4:
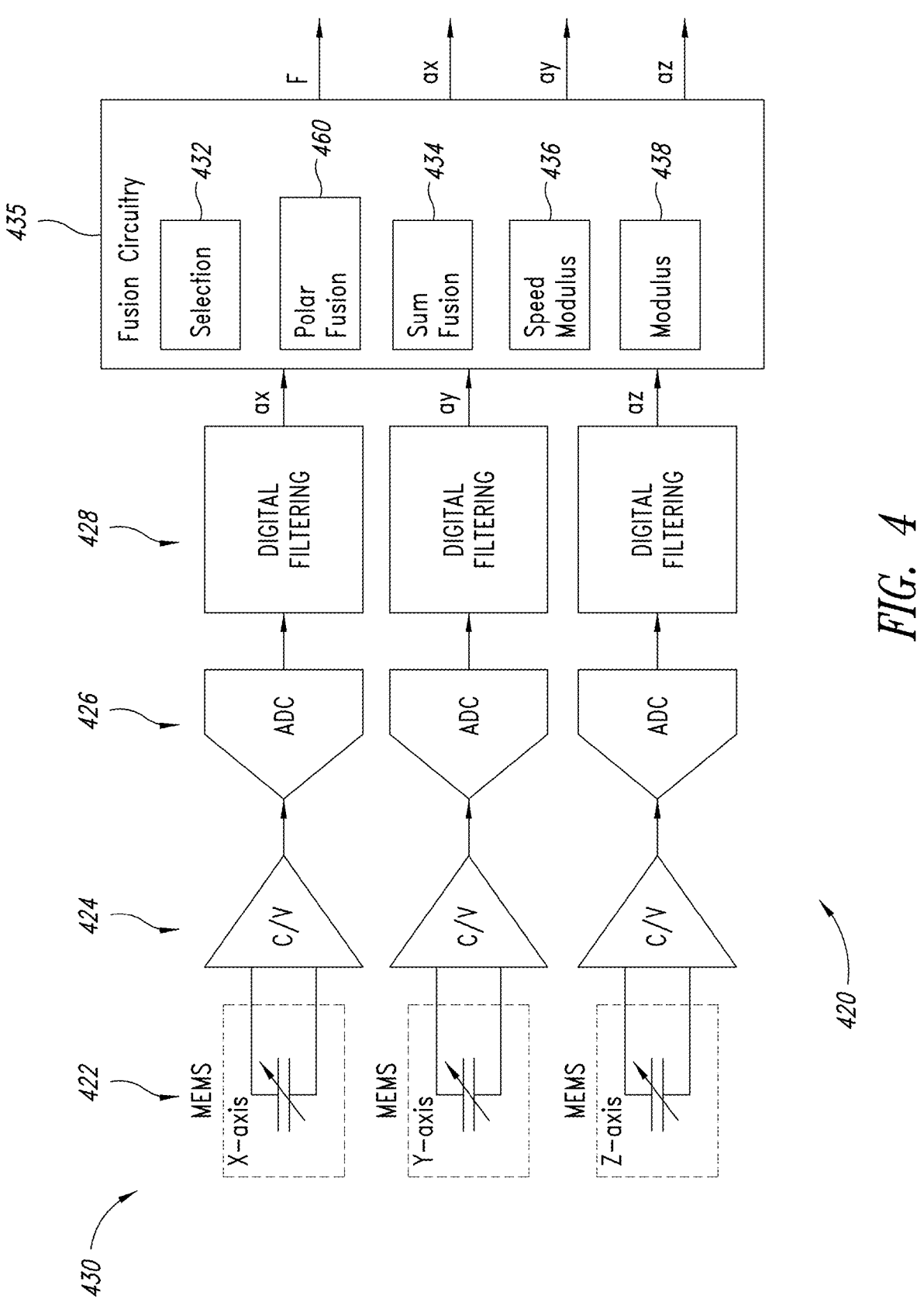
FIG. 4 is a functional block diagram of an embodiment of multi-axial inertial sensor device.

FIG. 4 is a functional block diagram on an embodiment of a multi-axial inertial sensing device 420, which may be employed as a sensor array 120 in the system 100 of FIG. 1 or as the sensor array 320 in the system 300 of FIG. 3. The sensing device 420 includes a plurality of microelectromechanical systems (MEMS) sensors 422, which in operation sense inertial sensor data, such as motion data related orientations, linear movements, accelerations, etc. The plurality of MEMS sensors 102 may include gyroscopes, accelerometers, etc. As illustrated, the plurality of MEMS sensors 422 includes three MEMS sensors 422, which together form a three-axial inertial sensor 430. In various embodiments, the multi-axial inertial sensing device 420 may include a different number of MEMS sensors to detect different number of axes. One of the MEMS sensors 422 detects motion along the X axis, one of the MEMS sensors 422 detects motion along the Y axis, and one of the MEMS sensors 422 detects motion along the Z axis.

As illustrated, the MEMS sensors 422 convert mechanical movements into detectable capacitive variations. The capacitive variations are converted to analog electrical signals by respective capacitive to electrical converters 424. The analog signals are converted to digital signals by respective analog to digital converters 426. Digital filtering, such as high-pass filtering may be applied to the digital signals by respective digital filters 428, for example, to improve the signal to noise ratio. The digital filters 428 provide respective signals inertial data signals ax, ay and az to fusion circuitry 435. In operation, the fusion circuitry 430 fuses the three inertial data signals ax, ay and az into a fused inertial data signal F, and outputs the fused inertial data signal F.

The fusion circuitry 435, as illustrated, comprises selection circuitry 432, polar fusion circuitry 460, sum fusion circuitry 434, speed modulus fusion circuitry 436 and modulus fusion circuitry 438. As discussed above, the conventional modulus fusion approach provides satisfactory results in some circumstances, and there may be applications which are configured to process a fused inertial data signal F generated using a modulus fusion approach. Other applications may perform better when a different fusion approach is applied, such as a speed modulus fusion approach, a sum fusion approach, or a polar fusion approach. Still other applications may be configured to process unfused sensor data. To facilitate the use of different fusion approaches, the fusion circuitry 430 includes selection circuitry 432, which, in operation selects a fusion approach to be applied from a set of fusion approach options available to the fusion circuitry 430. The selection may be based, for example, on a control signal, a type of application requesting the sensor data, information included in a request for sensor data, default selections, etc., and various combinations thereof.

The polar fusion circuitry 460, in operation, applies polar fusion techniques to the inertial data signals, e.g., ax, ay and az, to generate a fused signal F, as discussed in more detail below. The sum fusion circuitry 434, in operation, sums the inertial data signals, e.g., ax, ay and az, to generate a fused signal F. In some embodiments, high-pass-filtering may be applied prior to summing the inertial data signals. The speed modulus circuitry 436, in operation, applies a speed modulus fusion process, discussed above, to fuse the inertial data signals, e.g., ax, ay and az, to generate a fused signal F. The modulus circuitry 436, in operation, applies a modulus fusion process, discussed above, to fuse the inertial data signals, e.g., ax, ay and az, to generate a fused signal F.

Embodiments of the device 420 of FIG. 4 may include more components than illustrated, may include fewer components than illustrated, may combine components, may separate components into sub-components, and various combination thereof. For example, the fusion circuitry 435 in some embodiments may omit one or more of the speed modulus circuitry 436, the modulus circuitry 438, and the sum circuitry 434 (e.g., in an embodiment, the selection circuitry may select between polar fusion, sum fusion and unfused data, for example, when it is desired to use discrete circuitry to perform the fusion operation). In another example, the fusion circuitry 435 may comprise edge AI circuitry.

With reference to FIGS. 2 and 4, when the vibration of interest is along an axis of movement r, conceptually the sensor 430 may be physically rotated to align one of the axes of the multi-axial sensor 430 with the axis of movement r. For example, the sensor 430 could be rotated to align the axis r with the x-axis of the sensor. The data sensed with respect to the x-axis, e.g., ax in FIG. 4, could then be used as the fused data. In practice, it is generally not feasible to physically rotate the sensor to align an axis of interest with a determined axis of a multi-axial sensor 430.

Instead of rotating the sensor, the data may be rotated using Euler rotation or principal component analysis (PCA) to rotate the data onto a selected one of the axes of the multi-axial sensor 430. In the example discussed herein, with reference to FIGS. 2 and 4, the data is rotated onto the x-axis, and the result of the rotation onto the x-axis is used as the fused output signal F. The data, however, may be rotated onto any of the axes of a multi-axial sensor system.

In the context of a three-axial sensor, three rotation matrixes may be applied to the data. In a first rotation, the data may be rotated onto the x-axis according to:

$$
\begin{bmatrix} ax_{rx} \\ ay_{rx} \\ az_{rx} \end{bmatrix} = RX_{(tx)} \cdot \begin{bmatrix} ax \\ ay \\ az \end{bmatrix},
$$

where ax, ay, and az are the values of the data signals for the X, Y and Z axes respectively, and $Rx_{(tx)}$ is a first rotation matrix Rx for the angle tx between the axis of interest r and the x-axis. In general, the first rotation matrix Rx may be a matrix of the form:

$$
Rx = \begin{pmatrix} 1 & 0 & 0 \\ 0 & \cos(t) & -\sin(t) \\ 0 & \sin(t) & \cos(t) \end{pmatrix},
$$

where t is the angle between the axis of interest and the x-axis.

In a second rotation, the result of the first rotation may be rotated onto the y-axis according to:

$$
\begin{bmatrix} ax_{rxy} \\ ay_{rxy} \\ az_{rxy} \end{bmatrix} = Ry_{(ty)} \cdot \begin{bmatrix} ax_{rx} \\ ay_{rx} \\ az_{rx} \end{bmatrix},
$$

where $Ry_{(ty)}$ is a second rotation matrix for the angle ty between the axis of interest r and the y-axis. In general, the second rotation matrix Ry may be a matrix of the form:

$$
Ry = \begin{pmatrix} \cos(t) & 0 & \sin(t) \\ 0 & 1 & 0 \\ -\sin(t) & 0 & \cos(t) \end{pmatrix},
$$

where t is the angle between the axis of interest and the y-axis.

In a third rotation, the result of the second rotation may be rotated onto the z-axis according to:

$$
\begin{bmatrix} ax_{rxyz} \\ ay_{rxyz} \\ az_{rxyz} \end{bmatrix} = Rz_{(tz)} \cdot \begin{bmatrix} ax_{rxy} \\ ay_{rxy} \\ az_{rxy} \end{bmatrix}.
$$

where $Rz_{(tz)}$ is a third rotation matrix for the angle tz between the axis of interest r and the z-axis. In general, the third rotation matrix Rz may be a matrix of the form:

$$
Rz = \begin{pmatrix} \cos(t) & -\sin(t) & 0 \\ \sin(t) & \cos(t) & 0 \\ 0 & 0 & 1 \end{pmatrix},
$$

where t is the angle between the axis of interest and the z-axis.

As the output fused data will be the result for the x-axis, $ax_{rxyz}$, the rotation matrixes may be simplified to:

$$
Rx = \begin{pmatrix} 1 & 0 & 0 \\ 0 & \cos(t) & -\sin(t) \\ 0 & \sin(t) & \cos(t) \end{pmatrix}
$$

$$
Ry = \begin{pmatrix} \cos(t) & 0 & \sin(t) \\ 0 & 1 & 0 \\ -\cancel{\sin(t)} & \cancel{0} & \cancel{\cos(t)} \end{pmatrix}
$$

$$
Rz = \begin{pmatrix} \cos(t) & -\sin(t) & \cancel{0} \\ \cancel{\sin(t)} & \cancel{\cos(t)} & \cancel{0} \\ \cancel{0} & \cancel{0} & \cancel{1} \end{pmatrix}
$$

where the crossed-out matrix elements need not be determined because the result for the data rotated onto the x-axis $ax_{rxyz}$ does not depend on these elements. Thus, in the case of a three-axial sensor, the value F may be determined using eight multiplications and four sums. As noted above, the data may be rotated onto any one of the axes of the multi-axial sensor, and a similar simplification of the rotation matrixes may be applied.

Figure 5:
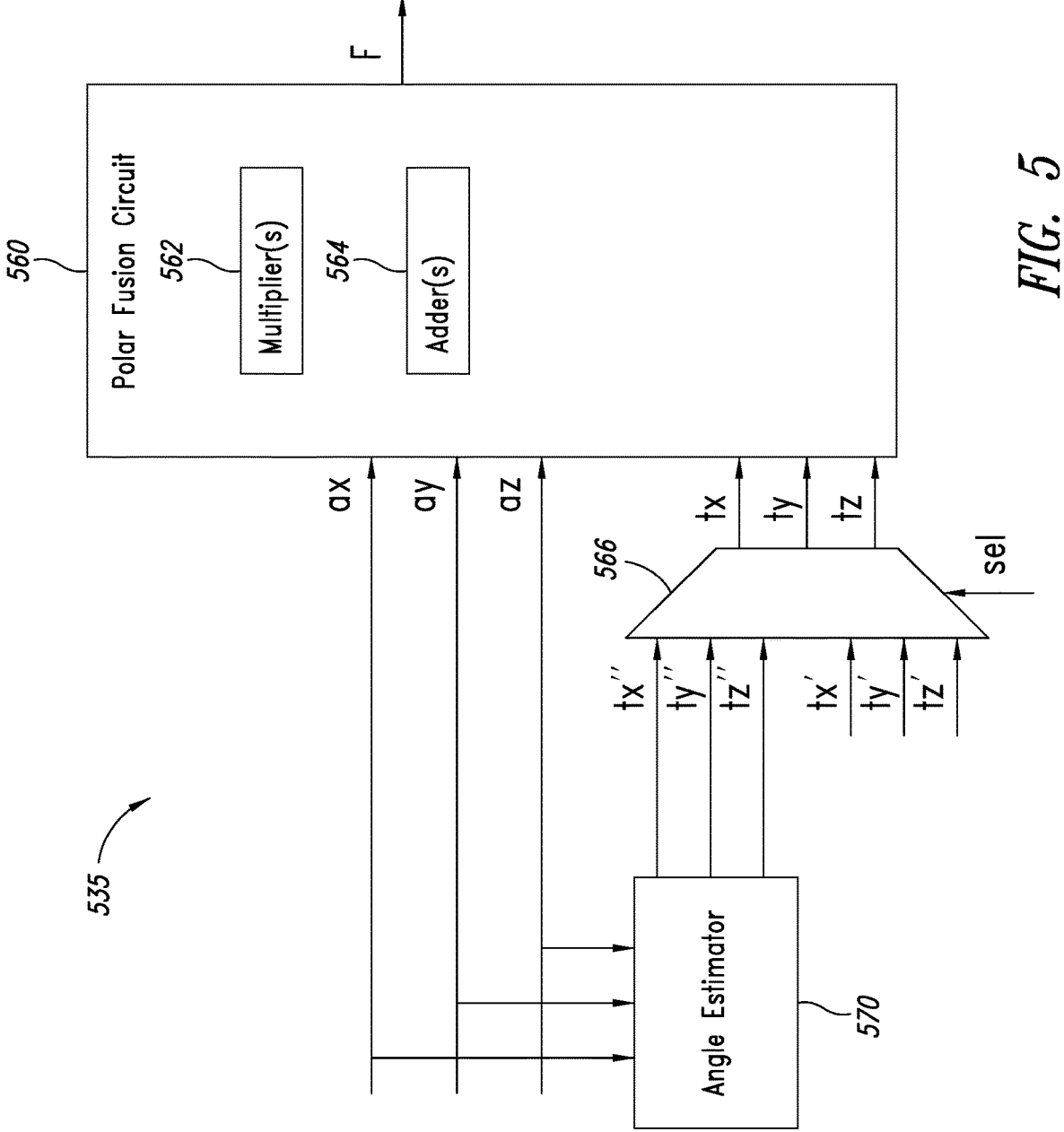
FIG. 5 is a functional block diagram of an embodiment of a data fusion circuit of a multi-axial inertial sensor device.

FIG. 5 is a functional block diagram of an embodiment of fusion circuitry 535 that may be employed, for example, as the fusion circuitry 435 of FIG. 4, or the fusion circuitry 335 of FIG. 3. The fusion circuitry 535 includes polar fusion circuit 560. The polar fusion circuit 560 as illustrated includes one or more multipliers 562 and one or more adders 564, which, in operation, generate a fused output signal based on the values ax, ay, az of the data signals of the X, Y and Z axes respectively, the angles between the X, Y and Z axis and the axis of interest or vibration, respectively, tx, ty and tz, and the simplified rotational matrixes Rx, Ry and Rz, for example, as discussed above.

In many applications, the angles between the axis of vibration and the axes of the sensor (with reference to FIG. 2, the respective angles between the axis of interest r and the axes X, Y and Z of the sensor), may be known and provided by an external source, stored and retrieved for use, or default values may be employed which provide satisfactory results. For example, in a bone conduction headset, the angle between the axes of the multi-axes sensors and an axis of vibration may be known or generally within a range such that fixed angles may be employed. As illustrated in FIG. 5, the fusion circuitry 535 includes a multiplexer 566 controlled by a selection signal Sel. When the angles tx, ty, tz are known, externally generated, or default angles are employed, the selection signal Sel may control the multiplexer 566 to select the known, externally generated or default angles tx', ty', tz' as the input angles tx, ty, tz provided to the polar fusion circuit 560.

In other applications, the angle between the axis of interest r and the axis of the sensor may change over time such that default values do not provide satisfactory results, and the angle information may not be readily available from an external source. For example, an axis of vibration of a smart watch may change frequently. As illustrated, the fusion circuitry 535 includes an angle estimator 570, which, in operation, estimates respective rotation angles tx", ty" and tz" based on the values ax, ay, az of the data signals of the X, Y and Z axes respectively. When the estimated rotation angles tx", ty", and tz" generated by the angle estimator 570 are to be employed, the selection signal Sel may control the multiplexer 566 to select the estimated rotation angles tx", ty", tz" generated by the angle estimator 570 as the input angles tx, ty, tz provided to the polar fusion circuit 560.

Figure 6:
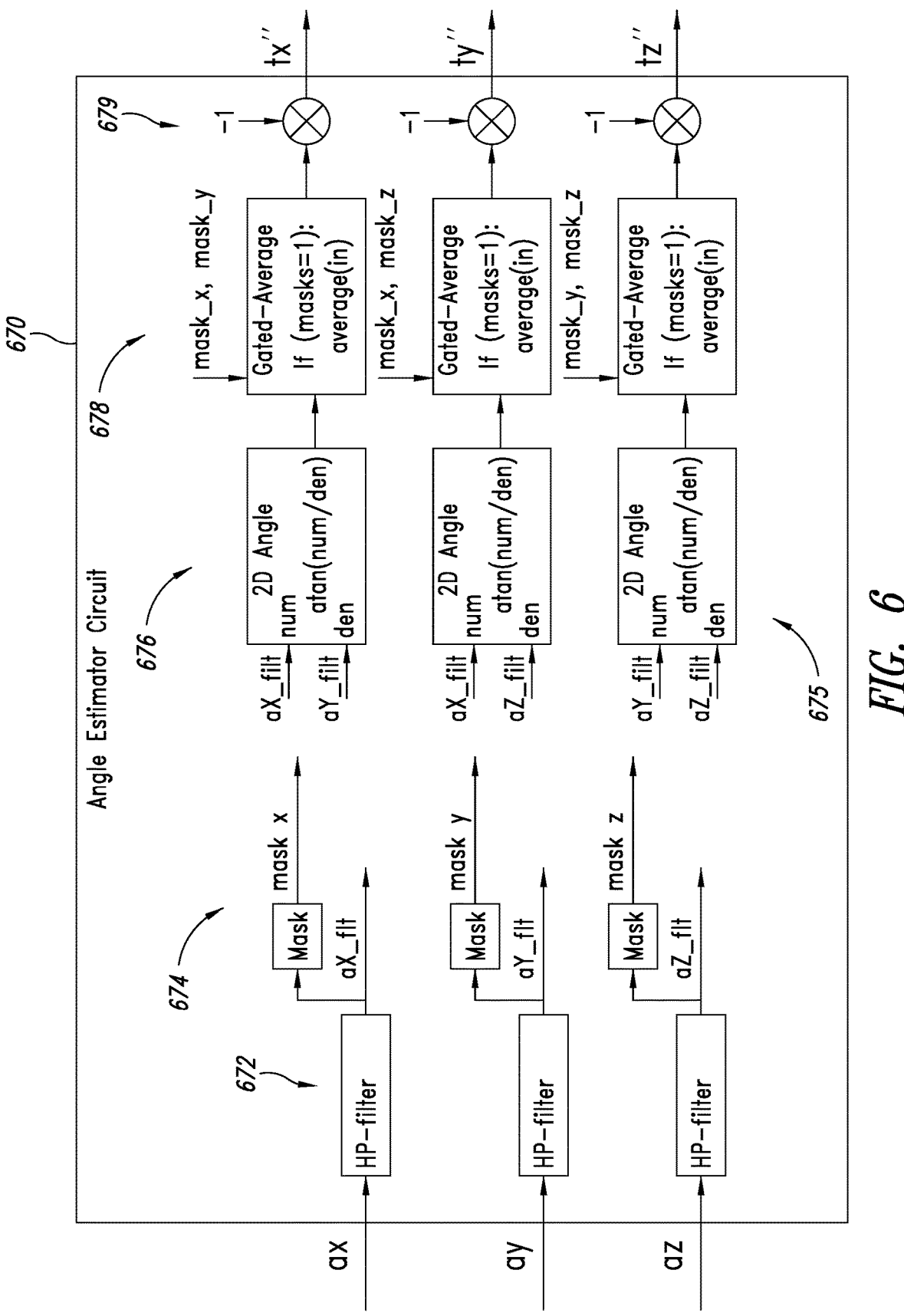
FIG. 6 is a functional block diagram of an embodiment of an angle estimation circuit of a multi-axial inertial sensor device.

FIG. 6 is a functional block diagram of an embodiment of an angle estimator 670 that may be employed, for example, as the angle estimator 570 of FIG. 5. The angle estimator 670, in operation, estimates two-dimensional angles between an axis of interest r and the axes of a sensor X, Y, Z, based on the values ax, ay, az of the data signals of the X, Y and Z axes respectively. For example, the angle estimator 670 may estimate angles which maximize the power of the signal on a selected axis. As illustrated, the angle estimator 670 includes high-pass filters 672, mask circuits 674, and angle estimation circuitry 675 including two-dimensional angle estimators 676, gated-average circuits 678, and multipliers 679.

The high-pass filters 672, in operation, high-pass filter the data signals ax, ay, az to remove the DC components of the data signals ax, ay, az, generating corresponding filtered data signals aX_flt, aY_flt, aZ_flt. The mask circuits 674, in operation, generate masks mask_x, mask_y, mask_z indicating whether magnitudes of the respective filtered data signals aX_flt, aY_flt, aZ_flt exceed a threshold value, for example, to prevent noise from impacting the estimated angles as discussed below. The two-dimensional angle estimators 676 apply an arctangent function to respective pairs of the filtered data signals aX_flt, aY_flt, aZ_flt, generating estimated angles. The gated average circuits 678 determine average estimated angles for the respective pairs of the filtered data signals, using the associated masks mask_x, mask_y, mask_z to gate the averaging functions. The multipliers 679 multiply the gated-average estimated angles by minus 1, so that the rotation is applied in a direction opposite to the estimated angles. The resulting rotation angles tx", ty", tz", may be provided to a polar fusion circuit, such as the polar fusion circuit 560 of FIG. 5.

Embodiments of the fusion circuitry 535 of FIG. 5 and of the angle estimator 670 of FIG. 6 may include more components than illustrated, may include fewer components than illustrated, may combine components, may separate components into sub-components, and various combination thereof. For example, the angle estimator 570 may be included in the polar fusion circuitry in some embodiments. In another example, the multiplexer 566 may be omitted in some embodiments, for example when a particular application will use a single source for the input angles tx, ty, tz (e.g., use the rotation angles estimated by the angle estimator 570). In another example, when a particular application will use externally provided or default values for the rotation angles, the multiplexer 566 and the angle estimator 570 may be omitted in some embodiments. In another example, other techniques to estimate angles may be employed by the angle estimator 670 in some embodiments.

FIG. 7 is a functional block diagram of an embodiment of bone-conduction device 700 having one or more multi-axial bone conduction sensors 730. The bone-conduction device 700 may employ polar fusion techniques to fuse axial data generated by the one or more multi-axial bone-conduction sensors 730. As illustrated, the bone-conduction device 700 is a headset having two sensor pods 701 coupled together by a headpiece 703. The sensor pods 701, in operation, rest on the check bones of a user of the bone-conduction device 700. As the user speaks, the sounds are carried by the check bones as vibrations. In operation, these vibrations are sensed by the multi-axial bone-conduction sensors 730, and the multi-axial data generated by the multi-axial bone-conduction sensors 730 may be fused using fusion circuitry 735. The fusion circuitry 735 may be similar to and operate in a similar manner as the fusion circuitry 535 of FIG. 5, the fusion circuitry 435 of FIG. 4, or the fusion circuitry 335 of FIG. 3. The bone-conduction device 700 includes one or more interfaces 706 (e.g., wireless communication interfaces, wired communication interfaces, etc.), which may provide the fused data to a host system and receive audio data from the host system, such as the host system 302 of FIG. 3. The audio data may be converted into vibrations by bone-conduction actuators 709, and transmitted to the check bones of the user.

Embodiments of the bone-conduction device 700 of FIG. 7 may include more components than illustrated, may include fewer components than illustrated, may combine components, may separate components into sub-components, and various combination thereof. For example, in some embodiments a single fusion circuit 735 may be provided instead of two fusion circuits 735 as illustrated in FIG. 7. In another example, some embodiments may employ speakers in addition to or instead of the bone-conduction actuators 709.

Figure 8:
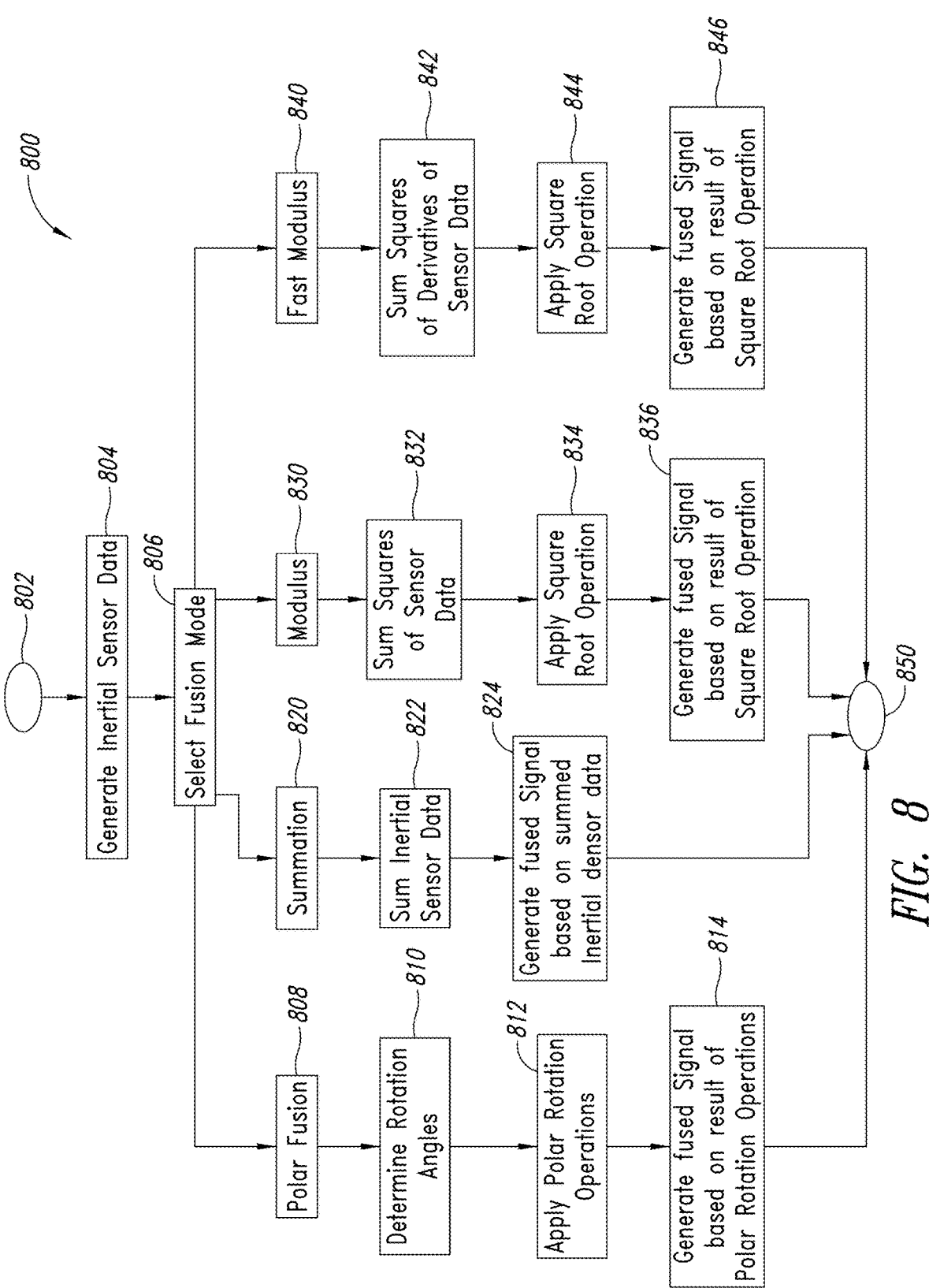
FIG. 8 illustrates an embodiment of a method of a process for fusing data generated by a multi-axial inertial sensor.

FIG. 8 illustrates an embodiment of a method 800 of a process for fusing data generated by a multi-axial inertial sensor, that may be employed by various devices and systems, such as, for example, the system 100 of FIG. 1, the system 300 of FIG. 3, the fusion circuitry 435 of FIG. 4, the polar fusion circuit 560 of FIG. 5, and the bone conduction device 700 of FIG. 7. For convenience, FIG. 8 will be described with reference to FIGS. 1, 4 and 5.

The method 800 starts at 802 and proceed to 804. At 804, the method 800 generates inertial sensor data values with respect to a plurality of axes of movement. This may be done, for example, using one or more sensors, such as the three-axial sensor 130 illustrated in FIG. 1, or the three MEMS 422 of FIG. 4. The method 800 proceeds from 804 to 806.

At 806, the method 800 optionally determines or selects a fusion mode to apply to generate a fused data signal based on the generated inertial sensor data. This may be done, for example, using the selection circuit 432 of FIG. 4. The selection may be based, for example, on a control signal, a type of application requesting the sensor data, information included in a request for sensor data, default selections, etc., and various combinations thereof.

When a polar fusion mode is selected at 806, the method 800 proceeds from 806 to 808, to implement a polar fusion process. The method proceeds from 808 to 810. At 810, angles of rotation to be applied during polar rotation operations are determined. The angles of rotation may be retrieved values stored in a memory or from a host device, default values, or values estimated using an angle estimation circuit, such as described above with reference to FIGS. 5 and 6. The method 800 proceeds from 810 to 812.

At 812, the method 800 applies polar rotation operations using the inertial sensor data values generated at 804 and the angles of rotation determined at 810. This may be done, for example, using the simplified rotational matrixes Rx, Ry and Rz, discussed above with reference to FIGS. 4 and 5. The method 800 proceeds from 812 to 814.

At 814, the method 800 generates a fused data signal based on a result of the polar rotation operations. For example, the result of the polar rotation operations for the x-axis, $ax_{r_{xyz}}$, may be used as the fused data signal. The method 800 proceeds from 814 to 850.

At 850, the method 800 may terminate, other processing may be performed by the method 800, such as processing of the fused data signal by a host processor (see host system 302 of FIG. 3, processing of additional generated inertial sensor data (e.g., returning to 808 to apply polar fusion to another set of inertial sensor data), or various combinations thereof.

When a summation fusion mode is selected at 806, the method 800 proceeds from 806 to 820, to implement a summation fusion process. The method proceeds from 820 to 822. At 822, the values of the inertial sensor data generated at 804 may be summed. The method proceeds from 822 to 824.

At 824, the method 800 generates a fused data signal based on a result of the summation operation performed at 822. For example, the fused result may be set equal to the sum of the values of the inertial sensor data. The method 800 proceeds from 824 to 850.

At 850, the method 800 may terminate, other processing may be performed by the method 800, such as processing of the fused data signal by a host processor (see host system 302 of FIG. 3, processing of additional generated inertial sensor data (e.g., returning to 820 to apply summation fusion to another set of inertial sensor data), or various combinations thereof.

When a modulus fusion mode is selected at 806, the method 800 proceeds from 806 to 830, to implement a modulus fusion process. The method proceeds from 830 to 832. At 832, the method 800 sums the squares of the values of the inertial sensor data generated at 804. The method proceeds from 832 to 834.

At 834, the method 800 performs a square root operation on the sum determined at 832. The method 800 proceeds from 834 to 836.

At 836, the method 800 generates a fused data signal based on a result of the square root operation performed at 834. For example, the fused result may be set equal to the result of the square root operation. The method 800 proceeds from 836 to 850.

At 850, the method 800 may terminate, other processing may be performed by the method 800, such as processing of the fused data signal by a host processor (see host system 302 of FIG. 3, processing of additional generated inertial sensor data (e.g., returning to 830 to apply modulus fusion to another set of inertial sensor data), or various combinations thereof.

When a speed modulus fusion mode is selected at 806, the method 800 proceeds from 806 to 840, to implement a speed modulus fusion process. The method proceeds from 840 to 842. At 842, the method 800 sums the squares of the values of derivative of the inertial sensor data generated at 804. The method proceeds from 842 to 844.

At 844, the method 800 performs a square root operation on the sum determined at 842. The method 800 proceeds from 844 to 846.

At 846, the method 800 generates a fused data signal based on a result of the square root operation performed at 844. For example, the fused result may be set equal to the result of the square root operation. The method 800 proceeds from 846 to 850.

At 850, the method 800 may terminate, other processing may be performed by the method 800, such as processing of the fused data signal by a host processor (see host system 302 of FIG. 3, processing of additional generated inertial sensor data (e.g., returning to 840 to apply speed modulus fusion to another set of inertial sensor data), or various combinations thereof.

Embodiments of the foregoing processes and methods may contain additional acts not shown in FIG. 8, may not contain all of the acts shown in FIG. 8, may perform acts shown in FIG. 8 in various orders, may combine acts, may split acts into separate acts, and may be otherwise modified in various respects. For example, an embodiment of FIG. 8 may be modified to omit one or more of the fusion techniques, to add additional fusion techniques, etc. In another example, in an embodiment the method 800 may proceed from 850 to 806, to select a fusion mode to be applied to a next set of inertial sensor data values.

In an embodiment, a device comprises one or more inertial sensors and fusion circuitry coupled to the one or more inertial sensors. The one or more inertial sensors, in operation, generate inertial sensor data with respect to a plurality of axes of movement. The fusion circuitry, in a polar fusion mode of operation, applies a plurality of polar rotation operations to the generated inertial sensor data to rotate the generated inertial sensor data onto an axis of the plurality of axes of movement. A fused data signal is generated based on a result of the plurality of polar rotation operations.

In an embodiment, the plurality of polar rotation operations are performed using: respective signal values associated with axes of the plurality of axes of movement; and angles associated with an axis of interest and respective axes of the plurality of axes of movement. In an embodiment, the angles are default angles. In an embodiment, the fusion circuitry, in operation, receives the angles from a host device.

In an embodiment, the fusion circuitry comprises an angle estimator, and the angle estimator, in operation, estimates the angles based on the respective signal values associated with axes of the plurality of axes of movement. In an embodiment, the angle estimator comprises: one or more high-pass filters, which, in operation, filter the respective signal values associated with axes of the plurality of axes of movement; mask circuitry, which, in operation, generates masks indicative of magnitudes of the respective signal values associated with axes of the plurality of axes of movement; and angle estimation circuitry, which, in operation, estimates the angles based on the filtered signal values associated with axes of the plurality of axes of movement and the masks indicative of magnitudes of the respective signal values associated with axes of the plurality of axes of movement. In an embodiment, the angle estimation circuitry comprises: arctangent circuitry, which, in operation, estimates two-dimensional angles based on pairs of the filtered signal values associated with axes of the plurality of axes of movement; gated average circuitry, which generates gated averages of the estimated two-dimensional angles using gating based on the masks indicative of magnitudes of the respective signal values associated with axes of the plurality of axes of movement; and a plurality of multipliers, which, in operation, multiply the gated averages of the estimated two-dimensional angles by minus 1.

In an embodiment, the fusion circuitry comprises one or more multipliers and one or more adders, and, in operation, the polar rotation operations are performed using the one or more multipliers and the one or more adders.

In an embodiment, the fusion circuitry comprises selection circuitry, which, in operation, selects a fusion mode of a plurality of fusion modes of operation, the plurality of fusion modes including the polar fusion mode of operation. In an embodiment, the plurality of fusion modes of operation include a sum fusion mode of operation, wherein the fusion circuitry, in the sum fusion mode of operation, sums the generated inertial sensor data to generate the fused data signal. In an embodiment, the plurality of fusion modes of operation include a speed modulus mode of operation, wherein the fusion circuitry, in the speed modulus mode of operation, generates the fused data signal based on a square root of a sum of squares of differential signals associated with the generated inertial sensor data. In an embodiment, the plurality of fusion modes of operation include a modulus mode of operation, wherein the fusion circuitry, in the modulus mode of operation, generates the fused data signal based on a square root of a sum of squares of the generated inertial sensor data.

In an embodiment, the one or more inertial sensors comprise micro-electromechanical sensors. In an embodiment, one or more inertial sensors comprise one or more multi-axial accelerometers. In an embodiment, the one or more inertial sensors comprise one or more multi-axial gyroscopes. In an embodiment, the one or more inertial sensors comprise one or more bone-conduction sensors, which, in operation, sense vibrations conducted by bones.

In an embodiment, a system comprises a host processor and a sensing device, which, in operation, is communicatively coupled to the host processor. The sensing device includes one or more inertial sensors and fusion circuitry coupled to the one or more inertial sensors. The inertial sensors, in operation, generate inertial sensor data with respect to a plurality of axes of movement. The fusion circuitry, in a polar fusion mode of operation, applies a plurality of polar rotation operations to the generated inertial sensor data to rotate the generated inertial sensor data onto an axis of the plurality of axes of movement. A fused data signal is generated based on a result of the plurality of polar rotation operations.

In an embodiment, the plurality of polar rotation operations are performed using respective signal values associated with axes of the plurality of axes of movement, and angles associated with an axis of interest and respective axes of the plurality of axes of movement. In an embodiment, the fusion circuitry comprises an angle estimator, and the angle estimator, in operation, estimates the angles based on the respective signal values associated with axes of the plurality of axes of movement. In an embodiment, the fusion circuitry comprises one or more multipliers and one or more adders, and, in operation, the polar rotation operations are performed using the one or more multipliers and the one or more adders. In an embodiment, the fusion circuitry comprises selection circuitry, which, in operation, selects a fusion mode of a plurality of fusion modes of operation, the plurality of fusion modes including the polar fusion mode of operation. In an embodiment, the one or more inertial sensors comprise micro-electromechanical sensors. In an embodiment, the one or more inertial sensors comprise one or more bone-conduction sensors, which, in operation, sense vibrations conducted by bones.

In an embodiment, a method comprises generating, using one or more inertial sensors of a sensing device, inertial sensor data with respect to a plurality of axes of movement; applying, using fusion circuitry of the sensing device, a plurality of polar rotation operations to the generated inertial sensor data to rotate the generated inertial sensor data onto an axis of the plurality of axes of movement; and generating, using the fusion circuitry, a fused data signal based on a result of the plurality of polar rotation operations. In an embodiment, the plurality of polar rotation operations are applied using: respective signal values associated with axes of the plurality of axes of movement; and angles associated with an axis of interest and respective axes of the plurality of axes of movement. In an embodiment, the method comprises estimating, using the fusion circuitry, the angles based on the respective signal values associated with axes of the plurality of axes of movement. In an embodiment, the method comprises selecting a fusion mode of a plurality of fusion modes of operation, the plurality of fusion modes of operation including a polar fusion mode of operation. In an embodiment, the generating inertial sensor data comprises sensing vibrations conducted by bones.

In an embodiment, a non-transitory computer-readable medium's contents configure a sensing device to perform a method. The method comprises generating inertial sensor data with respect to a plurality of axes of movement; applying a plurality of polar rotation operations to the generated inertial sensor data to rotate the generated inertial sensor data onto an axis of the plurality of axes of movement; and generating a fused data signal based on a result of the plurality of polar rotation operations. In an embodiment, the contents comprise instructions executable by the sensing device.

Some embodiments may take the form of or comprise computer program products. For example, according to one embodiment there is provided a computer readable medium comprising a computer program adapted to perform one or more of the methods or functions described above. The medium may be a physical storage medium, such as for example a Read Only Memory (ROM) chip, or a disk such as a Digital Versatile Disk (DVD-ROM), Compact Disk (CD-ROM), a hard disk, a memory, a network, or a portable media article to be read by an appropriate drive or via an appropriate connection, including as encoded in one or more barcodes or other related codes stored on one or more such computer-readable mediums and being readable by an appropriate reader device.

Furthermore, in some embodiments, some or all of the methods and/or functionality may be implemented or provided in other manners, such as at least partially in firmware and/or hardware, including, but not limited to, one or more application-specific integrated circuits (ASICs), digital signal processors, discrete circuitry, logic gates, standard integrated circuits, controllers (e.g., by executing appropriate instructions, and including microcontrollers and/or embedded controllers), field-programmable gate arrays (FPGAs), complex programmable logic devices (CPLDs), etc., as well as devices that employ RFID technology, and various combinations thereof.

The various embodiments described above can be combined to provide further embodiments. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A device, comprising:

one or more inertial sensors, which, in operation, generate inertial sensor data with respect to a plurality of sensor axes;

processing circuitry coupled to the one or more inertial sensors, wherein the processing circuitry, in a first mode of operation:

applies a plurality of polar rotation operations to the generated inertial sensor data to rotate the generated inertial sensor data onto a determined axis of the plurality of sensor axes; and generates a fused data signal based on a result of the plurality of polar rotation operations, wherein, in operation, the plurality of polar rotation operations are performed using:

respective signal values associated with axes of the plurality of sensor axes; and angles associated with an axis of interest and respective axes of the plurality of sensor axes, wherein, the one or more inertial sensors comprise one or more bone-conduction sensors, which, in operation, sense vibrations conducted by bones, the axis of interest is an axis of movement associated with a vibration of interest, and the fused data signal is an audio data signal.

2. The device of claim 1, wherein the angles are default angles.

3. The device of claim 1, wherein the processing circuitry, in operation, estimates the angles based on the respective signal values associated with axes of the plurality of sensor axes.

4. The device of claim 1, wherein the processing circuitry comprises:

one or more high-pass filters, which, in operation, filter the respective signal values associated with axes of the plurality of sensor axes, wherein the processing circuitry, in the first mode of operation:

generates masks indicative of magnitudes of the respective signal values associated with axes of the plurality of sensor axes; and estimates the angles based on the filtered signal values associated with axes of the plurality of sensor axes and the masks indicative of magnitudes of the respective signal values associated with axes of the plurality of sensor axes.

5. The device of claim 4, wherein, the processing circuitry, in the first mode of operation:

estimates two-dimensional angles based on pairs of the filtered signal values associated with axes of the plurality of sensor axes; and generates gated averages of the estimated two-dimensional angles using gating based on the masks indicative of magnitudes of the respective signal values associated with axes of the plurality of sensor axes; and the processing circuitry comprises a plurality of multipliers, which, in operation, multiply the gated averages of the estimated two-dimensional angles by minus 1.

6. The device of claim 1, wherein the processing circuitry comprises one or more multipliers and one or more adders, and, in operation, the polar rotation operations are performed using the one or more multipliers and the one or more adders.

7. The device of claim 1, wherein the processing circuitry, in operation, selects the first mode of operation from a plurality of modes of operation.

8. The device of claim 1, wherein the one or more inertial sensors comprise micro-electromechanical sensors.

9. A system, comprising:

a host processor; and a device, which, in operation, is communicatively coupled to the host processor, the device including:

one or more inertial sensors, which, in operation, generate inertial sensor data with respect to a plurality of sensor axes;

processing circuitry coupled to the one or more inertial sensors, wherein the processing circuitry, in operation:

applies a plurality of polar rotation operations to the generated inertial sensor data to rotate the generated inertial sensor data onto a determined axis of the plurality of sensor axes; and generates a fused data signal based on a result of the plurality of polar rotation operations, wherein, in operation, the plurality of polar rotation operations are performed using:

respective signal values associated with axes of the plurality of sensor axes; and angles associated with an axis of interest and respective axes of the plurality of sensor axes, wherein the one or more inertial sensors comprise one or more bone-conduction sensors, which, in operation, sense vibrations conducted by bones, the axis of interest is an axis of movement associated with a vibration of interest, and the host processor, in operation:

receives the fused data signal from the device; and performs audio signal processing based on the fused data signal.

10. The system of claim 9, wherein the processing circuitry, in operation, estimates the angles based on the respective signal values associated with axes of the plurality of axes of movement.

11. The system of claim 9, wherein the processing circuitry comprises one or more multipliers and one or more adders, and, in operation, the polar rotation operations are performed using the one or more multipliers and the one or more adders.

12. A method, comprising:

generating, using one or more inertial sensors of a sensing device, inertial sensor data with respect to a plurality of sensor axes;

applying, using processing circuitry of the sensing device, a plurality of polar rotation operations to the generated inertial sensor data to rotate the generated inertial sensor data onto a determined axis of the plurality of sensor axes; and generating, using the processing circuitry, a fused data signal based on a result of the plurality of polar rotation operations, wherein, the plurality of polar rotation operations are applied using:

respective signal values associated with axes of the plurality of sensor axes; and angles associated with an axis of interest and respective axes of the plurality of sensor axes, wherein the inertial sensor data is generated using one or more bone-conduction sensors of the sensing device, the axis of interest is an axis of movement associated with a vibration of interest, and the fused data signal is an audio data signal.

13. The method of claim 12, comprising:

estimating, using the processing circuitry, the angles based on the respective signal values associated with axes of the plurality of sensor axes.

14. A non-transitory computer-readable medium having contents which configure a sensing device to perform a method, the method comprising:

generating inertial sensor data with respect to a plurality of sensor axes;

applying a plurality of polar rotation operations to the generated inertial sensor data to rotate the generated inertial sensor data onto a determined axis of the plurality of sensor axes; and generating a fused data signal based on a result of the plurality of polar rotation operations, wherein, the plurality of polar rotation operations are applied using:

respective signal values associated with axes of the plurality of sensor axes; and angles associated with an axis of interest and respective axes of the plurality of sensor axes, wherein the inertial sensor data is generated using one or more bone-conduction sensors of the sensing device, the axis of interest is an axis of movement associated with a vibration of interest, and the fused data signal is an audio data signal.

\* \* \* \* \*